Patented June 5, 1934

1,961,551

UNITED STATES PATENT OFFICE 1,961,551

METHOD OF PRESERVING SWEETENED CONDENSED MILK

Eizo Chiashi, Kobe, Japan

No Drawing. Application March 9, 1932, Serial No. 597,870. In Japan March 11, 1931

3 Claims. (Cl. 99—11)

This invention relates to improvements in a method of preserving sweetened condensed milk, and particularly to the method of heating condensed milk sealed in a can without causing any crystallization of sugar.

Sweetened condensed milk sometimes deteriorates due to various bacterial causes even after it has been sealed in a can, because it has not been sterilized. Should it be sterilized by heating after it has been sealed in a can, the sugar contained in the condensed milk as very fine particles is melted and re-crystallized to larger particles when the milk is cooled, so that the market value of the condensed milk is greatly reduced.

The growth of bacteria in sweetened condensed milk is prevented by the preserving power of sucrose, but the antiseptic action of sugar against the fungus and yeast are not so effective as against the bacteria. The resisting power of bacteria against heat is great while that of the fungus and yeast is very small, and if they are heated to a temperature between 140° to 145° F. for one hour, they will be destroyed.

It has been demonstrated by the inventor that when sweetened condensed milk is heated at a temperature of not exceeding about 143° F., the re-crystallization of sugar is not caused irrespective of repeated heating and the duration of the time of each heating, while if the heating temperature exceeds about 145° F. the sugar is re-crystallized to large particles, the critical temperature being slightly variable by the viscosity of condensed milk and the amount of sucrose contained therein.

From these investigations, the inventor proposes that sweetened condensed milk, after it has been sealed in a can, should be heated at a temperature of about 142° F. to 144° F. for about one hour or more so that preservation of the condensed milk can be successfully secured. By this heating the fungus, yeast and the greater part of the bacteria contained in the condensed milk, which might have been contaminated after it was drawn from vacuo but before it was sealed in a can, are destroyed without jeopardizing the original fine crystallization of sugar and causing no alteration of the milk constituents to any remarkable degree.

In case it is desirable to make the contents of the can more sterile, it should be heated again at the above temperature after the sealed milk is once warmed at a lower temperature so that the spores of the still living bacteria have sprouted. Repeating the heating at the above temperature will not make the sweetened condensed milk re-crystallize sugar. The sweetened condensed milk treated under this invention is sterile, so that if desired, the percentage of cane sugar to be added to the condensed milk when it is manufactured can be reduced, such reduction being highly desirable to obtain a properly balanced food.

What I claim is:—

1. A method of preserving sweetened condensed milk which comprises heating the condensed milk after it has been sealed in a can at a temperature of about 142° F. to 144° F. whereby sterilization is effected and re-crystallization of the sugar is prevented.

2. A method of preserving sweetened condensed milk which comprises heating the condensed milk after it has been sealed in a can at a temperature of about 142° F. to 144° F., and again heating the sealed milk at the same temperature after the spore of still living bacteria has sprouted whereby sterilization is effected and re-crystallization of the sugar is prevented.

3. A method of preserving sweetened condensed milk which comprises heating the condensed milk after it has been sealed in a can at a temperature of about 143° F. whereby sterilization is effected and re-crystallization of the sugar is prevented.

EIZO CHIASHI.